United States Patent
Hunter et al.

(10) Patent No.: US 11,601,028 B2
(45) Date of Patent: Mar. 7, 2023

(54) ELECTRIC MACHINE, METHOD FOR PRODUCING AN ELECTRIC MACHINE, AND HYBRID-ELECTRIC AIRCRAFT

(71) Applicant: Rolls-Royce Deutschland Ltd & Co KG, Blankenfelde-Mahlow (DE)

(72) Inventors: William Hunter, Ottobrunn (DE); Peter Gröppel, Erlangen (DE); Matthias Böhm, Neuendettelsau (DE); Joachim Hubmann, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 77 days.

(21) Appl. No.: 17/046,296

(22) PCT Filed: Mar. 22, 2019

(86) PCT No.: PCT/EP2019/057208
§ 371 (c)(1),
(2) Date: Oct. 8, 2020

(87) PCT Pub. No.: WO2019/197136
PCT Pub. Date: Oct. 17, 2019

(65) Prior Publication Data
US 2021/0075287 A1    Mar. 11, 2021

(30) Foreign Application Priority Data
Apr. 9, 2018   (DE) .................... 10 2018 205 266.2

(51) Int. Cl.
*H02K 3/30*     (2006.01)
*B64D 27/02*    (2006.01)
(Continued)

(52) U.S. Cl.
CPC ............... *H02K 3/30* (2013.01); *B64D 27/02* (2013.01); *B64D 27/24* (2013.01); *H02K 3/24* (2013.01);
(Continued)

(58) Field of Classification Search
CPC .. H02K 3/24; H02K 3/30; H02K 3/34; H02K 3/40; H02K 15/105; B64D 27/02; B64D 27/24; B64D 2027/026
(Continued)

(56) References Cited

U.S. PATENT DOCUMENTS

2003/0001441 A1    1/2003   Peterson
2008/0309444 A1*   12/2008  Sorg ...................... H01F 27/323
                                                          174/137 R
(Continued)

FOREIGN PATENT DOCUMENTS

| DE | 102006044001 A1 | 3/2008 |
| DE | 112007000364 T5 | 11/2008 |
| JP | 2014222973 A | 11/2014 |

OTHER PUBLICATIONS

International Search Report and Written Opinion for International Patent Application PCT/EP2019/057208 dated Jul. 3, 2019.

*Primary Examiner* — Rashad H Johnson
(74) *Attorney, Agent, or Firm* — Lempia Summerfield Katz LLC

(57) ABSTRACT

The electric machine comprises at least one winding (30) having at least one conductor (20) and electrical insulation for insulating one or more of the windings (30) and/or conductors (20), wherein the insulation is formed by a metal oxide. The method for producing such an electric machine having at least one winding (30) having at least one conductor (20) comprises the steps of metallizing the at least one winding (30) and/or conductor (20) with metal and
(Continued)

oxidizing the metal. The aircraft is in particular an electric or hybrid-electric aircraft and has such an electric machine (10).

19 Claims, 3 Drawing Sheets

(51) Int. Cl.
*B64D 27/24* (2006.01)
*H02K 3/24* (2006.01)
*H02K 3/34* (2006.01)
*H02K 15/10* (2006.01)

(52) U.S. Cl.
CPC ............ *H02K 3/34* (2013.01); *H02K 15/105* (2013.01); *B64D 2027/026* (2013.01)

(58) Field of Classification Search
USPC .......................................................... 310/65
See application file for complete search history.

(56) References Cited

U.S. PATENT DOCUMENTS

| 2011/0095621 A1* | 4/2011 | Petersen | ............... H01H 37/002 |
| | | | 307/117 |
| 2022/0069654 A1* | 3/2022 | Bodla | ....................... H02K 3/14 |
| 2022/0144112 A1* | 5/2022 | Bortolato | ................ B60L 53/18 |

\* cited by examiner

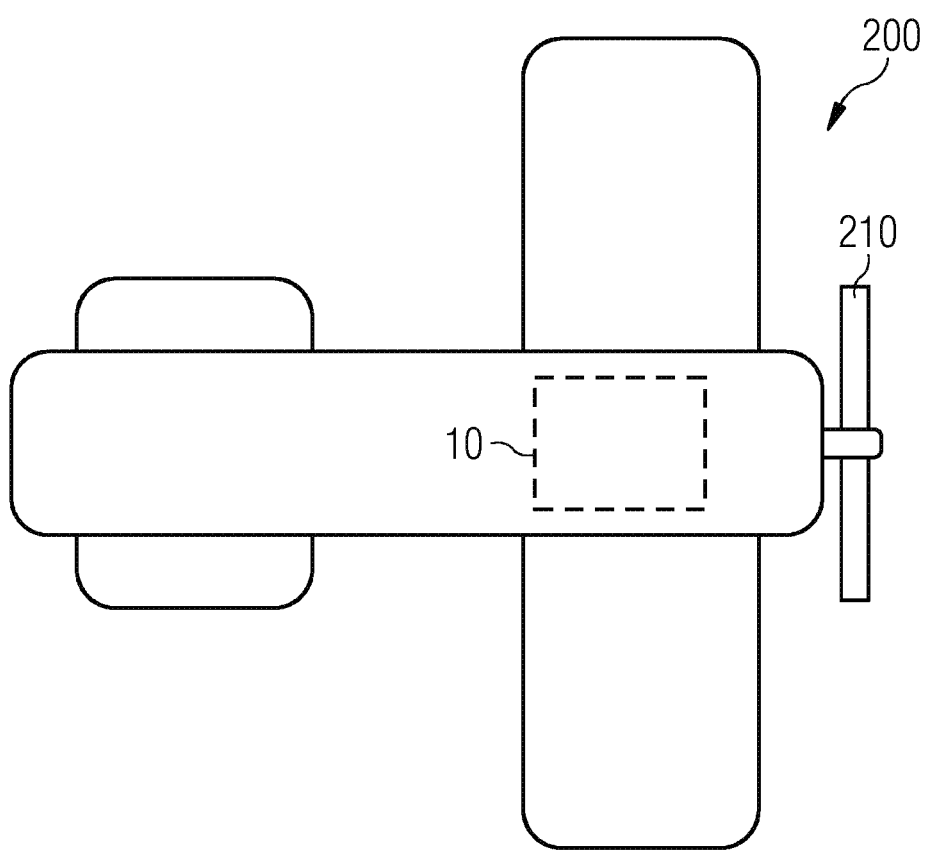

ELECTRIC MACHINE, METHOD FOR PRODUCING AN ELECTRIC MACHINE, AND HYBRID-ELECTRIC AIRCRAFT

This application is the National Stage of International Application No. PCT/EP2019/057208, filed Mar. 22, 2019, which claims the benefit of German Patent Application No. DE 10 2018 205 266.2, filed Apr. 9, 2018. The entire contents of these documents are hereby incorporated herein by reference.

BACKGROUND

The present embodiments relate to an electric machine, a method for producing an electric machine, and a hybrid-electric aircraft.

The development of electric motors is aimed at optimizing the efficiency, power to weight ratio, reliability and service life. However, these variables are mutually dependent: a low motor weight generally results in a lower efficiency. On the other hand, a long service life in most cases requires a correspondingly dimensioned cooling system, which has a disadvantageous effect on the heat dissipation.

However, good heat dissipation is essential for an adequate service life. Particularly important is the heat dissipation in motors/generators that run at a high voltage with simultaneously elevated clock frequencies and/or are operated by converters, since additional heat is produced by the polarization effects that increase with the frequency. This is because, in the case of electric engines, "ohmic losses", skin losses, and proximity losses occur with the increase in frequency. Therefore, the prior art includes using stranded conductors that, in contrast to solid conductors, consist of individual mutually insulated wires and therefore partially limit the losses.

At the same time, efficient cooling and insulation is necessary for a compact construction and a low power to weight ratio.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an electric machine, in which good electrical insulation of conductors is provided, is provided. As another example, the electric machine is enabled to be as compact as possible. As yet another example, a method for producing such an electric machine and an aircraft that may be designed compactly and with a low weight to power ratio is provided.

The electric machine according to the present embodiments includes at least one winding having at least one electrical conductor and at least one electrical insulation for insulating one or more of the windings and/or conductors. In the electric machine according to the present embodiments, the at least one insulation is formed with a metal oxide. A comparatively thin layer of metal oxide already advantageously has a high dielectric strength that is in the range of more than a thousand volts at a thickness of at least 10 micrometers. The insulation according to the present embodiments is therefore configured particularly compactly and with a low weight. In the electric machine according to the present embodiments, the metal oxide is particularly advantageously arranged on the surface of at least one electrical conductor. In this case, the electric machine according to the present embodiments may be produced particularly easily in that the at least one conductor is oxidized on the surface.

Oxidized metal (e.g., aluminum oxide) advantageously exhibits good thermal conductivity, so that, in addition to adequate electrical insulation, efficient cooling due to the good thermal conductivity via the metal oxide is simultaneously possible.

In the electric machine according to the present embodiments, the at least one winding may include at least one strand having the at least one conductor (e.g., having at least two or more conductors). The electric machine may also include at least one groove, where the at least one strand is arranged in the benefit.

The electric machine may be a rotating machine and may be converter-controlled. In the electric machine according to the present embodiments, the metal oxide may include aluminum oxide and/or silver oxide. Therefore, the non-oxidized metals aluminum and silver are good conductors that may be oxidized on the surface to form aluminum oxide or silver oxide. Aluminum oxide already has a dielectric strength of more than 1000 volts at a layer thickness of a few 10s of micrometers. Silver oxide also has an adequately high dielectric strength for use in electric machines.

In a further development of the electric machine, at least two (e.g., more than two) conductors are present, and the conductors have a substantially triangular, quadrangular (e.g., rectangular), or hexagonal cross-section. The conductors may thus be arranged together particularly compactly (e.g., with a fill factor of almost 100 percent). A substantially triangular, quadrangular (e.g., rectangular), or hexagonal cross-section may be that the cross-sections of the copper wires do not necessarily have a triangular, quadrangular, or hexagonal cross-section, but rather suitably rounded corners, where the rounding radius of a rounded corner constitutes a fraction of an edge length of the ideal triangular, quadrangular, or hexagonal form of the cross-section (e.g., less than or at most a quarter of this edge length).

In the electric machine according to the invention, the insulation is preferably formed with metal with a surface layer with the metal oxide. In this way, either a metal which is already present, for instance in the form of the conductor, can be used, which is oxidized on the surface. Alternatively and likewise advantageously, the insulation can be produced in that metalization with the metal firstly takes place and the metal is then oxidized.

In the electric machine according to the present embodiments, the insulation is suitably formed with plastic material with a surface layer with the metal oxide. For example, the plastic material is firstly metalized with metal, and the metal is then oxidized. In a continuation of this further development, the plastic material forms a sheath (e.g., a tube or a hose).

The electric machine according to the present embodiments may include a sheath for at least one conductor (e.g., a tube or a hose, such as a shrink hose) with the metal oxide. In a further development, the sheath is a tube that circumferentially surrounds two or more conductors in the form of at least one strand. In this way, the one or more strands may be easily fixed in place by the tube or the hose. The at least one strand is therefore arranged with little susceptibility to vibrations or mechanical shocks, so that, for example, movements of the individual electrical conductors of the strand with respect to one another are reduced: Consequently, damage or even short circuits within the strand(s) during operation of the machine according to the present embodiments may be prevented. Additional bonding of the individual electrical conductors (e.g., via baking enamel or adhesives) may therefore be omitted. In one embodiment, the tube may be pressed into a form corresponding to a benefit of the electric machine.

The electric machine may have a cooling circuit with a coolant path, where the sheath (e.g., a tube) forms part of the coolant path. The at least one electrical conductor and, for example, the possibly present one or more strands may thus be cooled very efficiently in that coolant (e.g., a fluid such as gaseous hydrogen) is conducted through the sheath.

The electric machine may include a surface insulating material with the plastic material.

In a further development, the electric machine has a contour, and the strand and/or the sheath has a cross-sectional contour that corresponds to the contour of the electric machine (e.g., a rectangular cross-sectional contour). In this way, the strand and/or the sheath may be easily inserted into the contour of the electric machine so that the strand and/or the sheath may be easily fixed in place in the contour of the electric machine (e.g., a groove of the electric machine), by a corresponding contour of the strand and/or the sheath. In this further development, the at least one strand is arranged with little susceptibility to vibrations or mechanical shocks so that movements of the individual electrical conductors of the strand with respect to one another are reduced.

The method according to the present embodiments for producing an electric machine having at least one winding with at least one conductor (e.g., an electric machine), as described above, includes metalizing the at least one winding and/or conductor with metal, and oxidizing the metal.

The aircraft according to the present embodiments may be an electric or hybrid-electric aircraft. The aircraft according to the present embodiments has an electric machine according to the present embodiments, as described above.

BRIEF DESCRIPTION OF THE DRAWINGS

FIG. 6 shows a schematic plan view of one embodiment of an electric aircraft with the electric machine according to FIG. 1.

DETAILED DESCRIPTION

Figure 1:
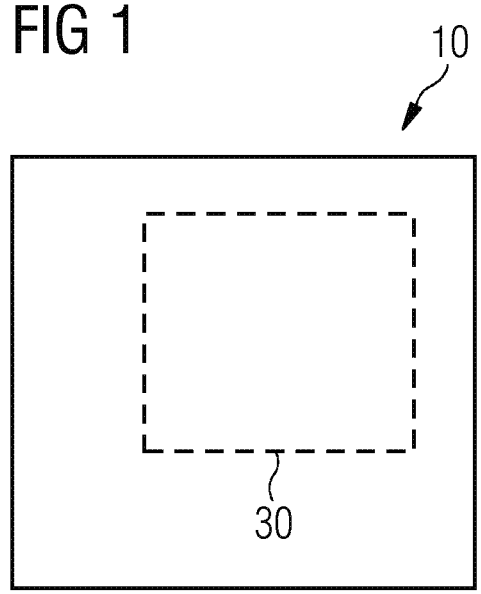
FIG. 1 shows one embodiment of an electric machine with a winding pack in a schematic diagram.

The electric machine 10 according to the present embodiments, which is illustrated in FIG. 1, includes a winding pack 30 formed with copper wires 20.

Figure 2:
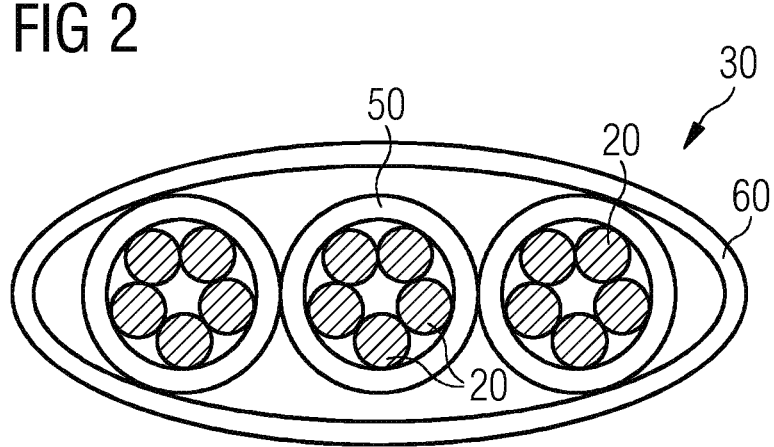
FIG. 2 shows a cross-section of a winding pack of the electric machine according to FIG. 1 in a further exemplary embodiment.

As illustrated in FIG. 2, the winding pack 30 includes a plurality of strands 40 (e.g., three in the exemplary embodiment). Each of the strands 40 includes a plurality of copper wires 20 that abut against one another along corresponding longitudinal extents.

It is known to provide surface insulation of the copper wires 20. According to the present embodiments, the electrical insulation of the copper wires 20 is realized by aluminum oxide:

To this end, each of the copper wires 20 is coated with a layer of aluminum with a thickness of a few 10s of micrometers. The aluminum deposited on the copper wire 20 is anodized in a manner known per se so that, instead of the original layer of aluminum, a layer of aluminum oxide now remains on the copper wire 20 (the layer of aluminum oxide is not shown explicitly in FIG. 1). The layer of aluminum oxide in the illustrated case is, for example, approximately 50 micrometers thick and has a dielectric strength of, for example, 1,213 volts.

The strands 40 are not only electrically insulated with respect to individual copper wires 20, but the strands 40 are also electrically insulated from one another to provide the dielectric strength. To this end, the strands 40 are held together by a shrink hose 50, which is coated with aluminum oxide. To this end, the shrink hose 50 is formed in a manner known with a plastic material that, according to the present embodiments, has firstly been surface-coated with aluminum on an inside and on an outside; the aluminum is subsequently anodized.

In further exemplary embodiments that are not illustrated specifically, instead of a shrink hose 50, a surface insulating material formed with plastic material may essentially also be used. According to an embodiment, the surface insulating material is surface-coated with aluminum, and the aluminum is subsequently anodized. The surface insulating material is thus coated with aluminum oxide. The surface insulating material in this further exemplary embodiment is wound around the strands 40 instead of the shrink hose 50.

The strands 40 are combined to form a winding pack 30, which is additionally electrically insulated from further winding packs 30 to provide an adequate dielectric breakdown capacity. To this end, the strands 40 are guided in a very thin aluminum tube 60, which has a thickness of a few 100s of micrometers and is anodized on an inside and on an outside to a depth of several 10s of micrometers (e.g., 50 micrometers in the illustrated embodiment). The winding packs 30 are therefore also electrically insulated by aluminum oxide. In further exemplary embodiments, not illustrated specifically, an electrically insulating plastic material based on polymer is additionally applied to the inner surface and the outer surface of the aluminum tube 60 and further increases the dielectric breakdown capacity.

Figure 3:
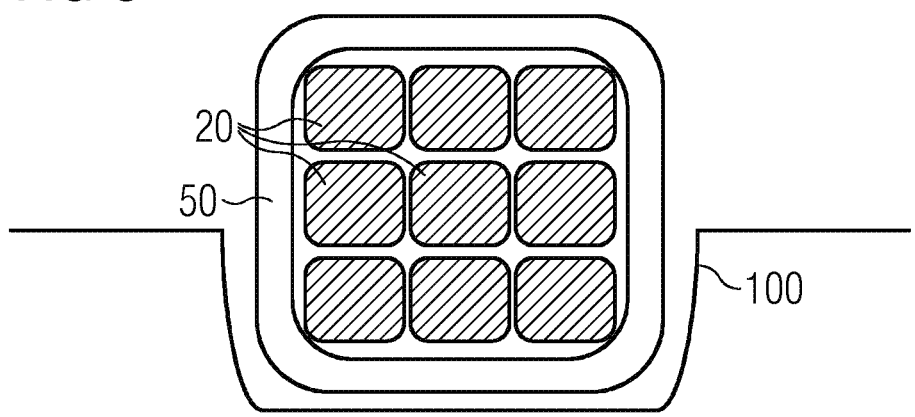
FIG. 3 shows a schematic cross-section of one embodiment of a strand of the winding pack of the electric machine according to FIG. 1.
Figure 4:
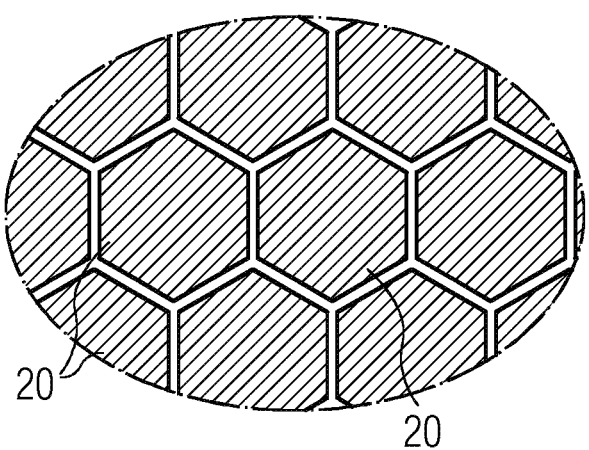
FIG. 4 shows a cross-section of a strand of the winding pack of the electric machine according to FIG. 1 in a further exemplary embodiment.
Figure 5:
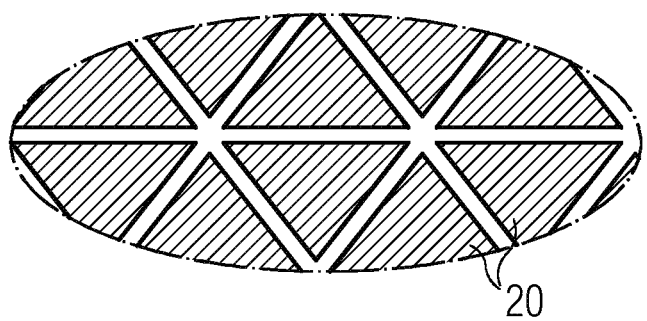
FIG. 5 shows a strand of the winding pack of the electric machine according to FIG. 2 in a further exemplary embodiment.

In further exemplary embodiments illustrated in FIGS. 3 to 5, the strands 40 include individual copper wires 20 having a cross-section other than a circular cross-section: therefore, the individual copper wires as illustrated in FIG. 3 may have a substantially rectangular cross-section or a substantially hexagonal cross-section, as illustrated in FIG. 4, or a substantially triangular cross-section as illustrated in FIG. 5. In this context, the phrase "substantially" simply provides that the cross-sections of the copper wires 20 are not geometrical polygons, but instead, have rounded corners. The rounding radius of the rounded corners constitutes a fraction of an edge length (e.g., less than or at most a quarter of the edge length of such a polygon). In these exemplary embodiments illustrated in FIGS. 3 to 5, the fill factor is increased to almost 100 percent.

The electric machine 10 includes a hydrogen cooling circuit (not illustrated in detail). The aluminum tube 60 forms part of a hydrogen cooling path of the hydrogen cooling circuit to cool the strands 40. Using the hydrogen cooling path, gaseous hydrogen may be conducted through the aluminum tube 60, past the strands 40, so that the strands 40 may be efficiently cooled.

As in the exemplary embodiment illustrated in FIG. 3, the aluminum tube 60 may have a rectangular cross-sectional contour that corresponds to a likewise substantially rectangular recess (e.g., a groove 100) of the electric machine 10. The aluminum tube 60 is pressed into the groove 100.

The hybrid-electric aircraft 200 illustrated in FIG. 6 includes the electric machine 10 in the form of an electric motor. The electric machine 10 drives a propeller 210 of the aircraft 200 to propel the aircraft 200.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An electric machine comprising:
   at least one winding including:
      at least one conductor;
      first electrical insulation for insulating the at least one winding, the first electrical insulation including plastic material with a surface layer with a first metal oxide; and
      second electrical insulation in the at least one conductor, the second electrical insulation including a second metal oxide.

2. The electric machine of claim 1, wherein the at least one winding comprises at least one strand having the at least one conductor.

3. The electric machine of claim 2, further comprising a sheath, the sheath including the first electrical insulation with the first metal oxide, or including a third electrical insulation with a third metal oxide.

4. The electric machine of claim 3, further comprising a cooling circuit with a coolant path,
   wherein the sheath forms part of the coolant path.

5. The electric machine of claim 3, wherein the at least one strand, the sheath, or the at least one strand and the sheath have a cross-sectional contour that corresponds to a contour of the electric machine.

6. The electric machine of claim 3, wherein the sheath is a tube or a hose with the first metal oxide or the third metal oxide.

7. The electric machine of claim 6, wherein the sheath is a shrink hose with the first metal oxide or the third metal oxide.

8. The electric machine of claim 3, wherein the sheath includes the first electrical insulation, and abuts and surrounds the at least one strand.

9. The electric machine of claim 3, wherein the sheath includes the third electrical insulation, and abuts and surrounds the at least one conductor.

10. The electric machine of claim 2, wherein the at least one conductor includes two or more conductors.

11. The electric machine of claim 1, wherein the first metal oxide and the second metal oxide comprise aluminum, silver oxide, or aluminum and silver oxide.

12. The electric machine of claim 1, wherein the at least one conductor has a triangular, quadrangular, or hexagonal cross-section.

13. The electric machine of claim 12, wherein the at least one conductor has a rectangular cross-section.

14. The electric machine of claim 1, wherein the first electrical insulation is formed with metal with a surface layer with the first metal oxide.

15. The electric machine of claim 1, further comprising a surface insulating material with the plastic material.

16. A method for producing an electric machine having at least one winding with at least one conductor and electrical insulation for insulating one or more windings of the at least one winding, the method comprising:
   metallizing a plastic material of the electrical insulation of the at least one winding with metal; and
   oxidizing the metal, such that a surface layer of metal oxide is formed.

17. An aircraft comprising:
   an electric machine comprising:
      at least one winding including:
         at least one conductor;
         first electrical insulation for insulating the at least one winding, the first electrical insulation including plastic material with a surface layer with a first metal oxide; and
         second electrical insulation in the at least one conductor, the second electrical insulation including a second metal oxide.

18. The aircraft of claim 17, wherein the aircraft is an electric aircraft or a hybrid-electric aircraft.

19. An electric machine comprising:
   at least one winding including:
      at least one strand comprising at least one conductor and electrical insulation for insulating one or more windings of the at least one winding; and
   a sheath with the metal oxide,
   wherein the sheath is a shrink hose with the metal oxide.

* * * * *